United States Patent [19]

Franzen

[11] Patent Number: 5,302,957
[45] Date of Patent: Apr. 12, 1994

[54] PASSIVE RANGING SYSTEM

[75] Inventor: John P. Franzen, Live Oak, Tex.

[73] Assignee: The United States of America as represented by the Secretary of the Air Force, Washington, D.C.

[21] Appl. No.: 55,457

[22] Filed: May 3, 1993

[51] Int. Cl.⁵ .......................................... G01S 13/08
[52] U.S. Cl. ........................................ 342/125; 342/33
[58] Field of Search ..................... 342/33, 34, 35, 125, 342/398

[56] References Cited

U.S. PATENT DOCUMENTS

| | | | |
|---|---|---|---|
| 3,687,556 | 8/1972 | Price et al. | 356/152 |
| 4,438,439 | 3/1984 | Shreve | 343/449 |
| 4,916,451 | 4/1990 | Ishita | 342/35 |
| 5,053,784 | 10/1991 | Hippelainen | 342/434 |

Primary Examiner—Mark Hellner
Attorney, Agent, or Firm—Gerald B. Hollins; Thomas L. Kundert

[57] ABSTRACT

A passive distance measuring system for aircraft landing or other transportation related or other general usage is disclosed. The passive system operates by measuring the time interval between arrival of a precision sweep scanned signal such as a radio frequency signal at two widely dispersed different signal receptor locations on the aircraft. By knowing the angular sweep velocity of the received signals and the receptor or antenna separation distance on the aircraft, the distance of the aircraft from the scanning source of, for example, radio frequency signals may be computed with appreciable precision. The disclosure includes analog-to-digital signal conversion and modifications of the invention including optical or laser signals in lieu of the preferred microwave radio frequency signals. The disclosure also includes a table of numeric values relating pulse separation time to aircraft range distance and indicates a number of equipment and military environment advantages of the invention.

10 Claims, 2 Drawing Sheets

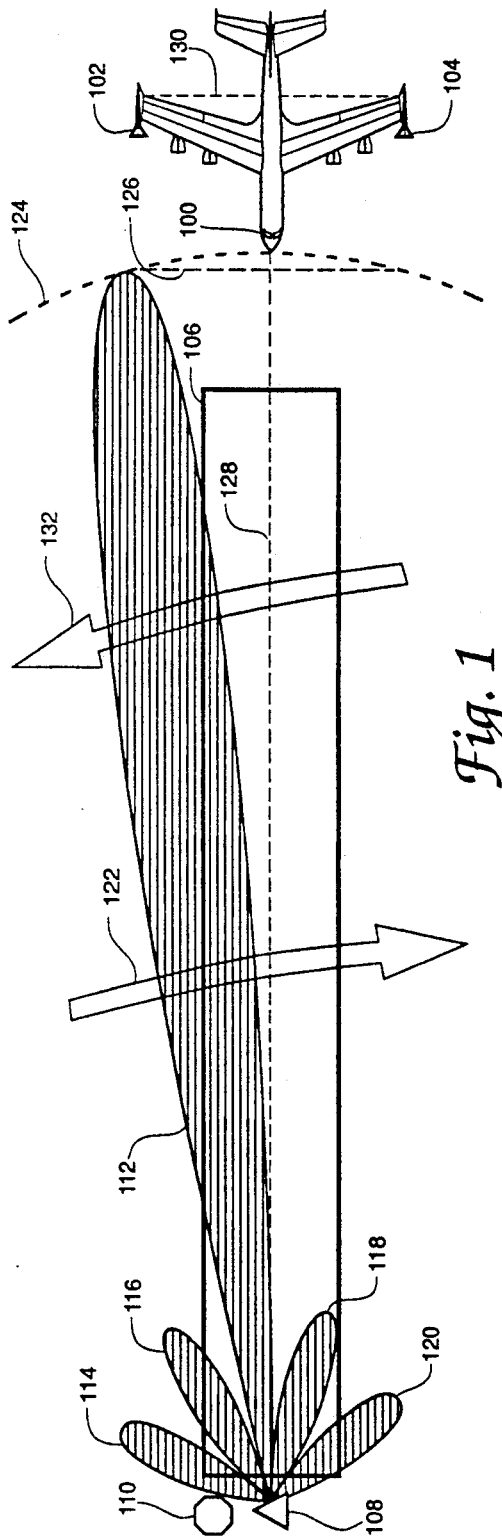
Fig. 1
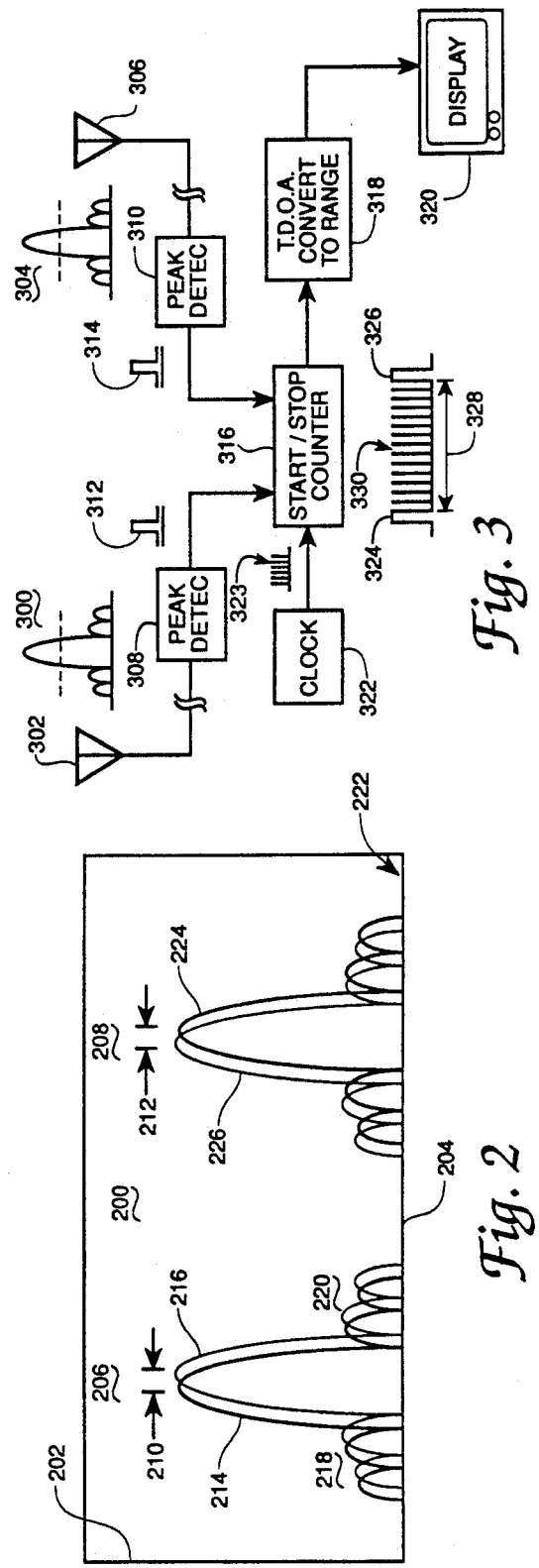
Fig. 3
Fig. 2

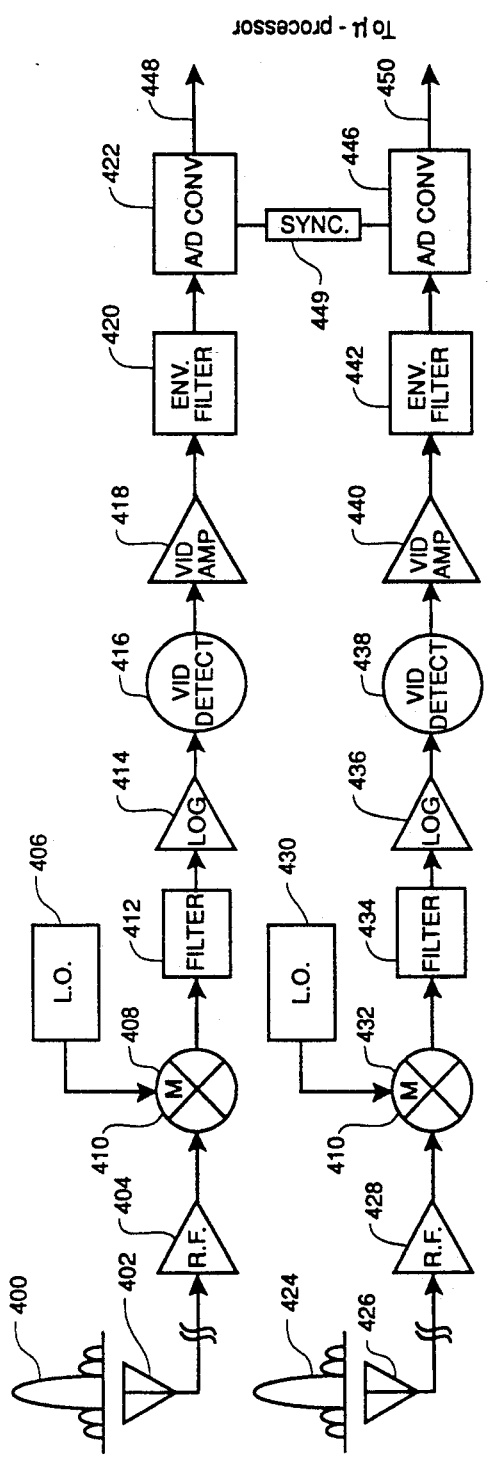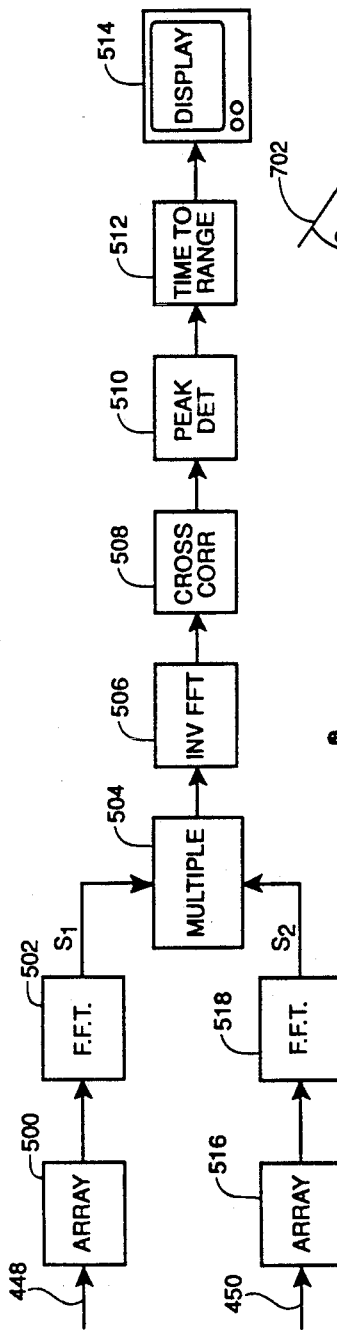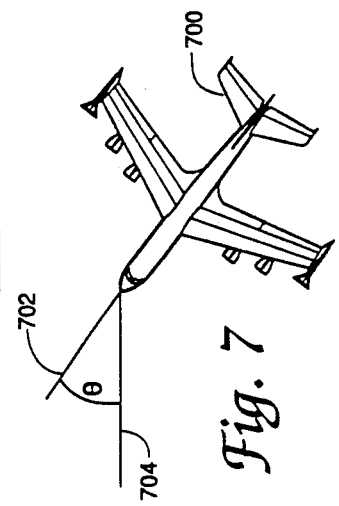

PASSIVE RANGING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to the field of electronic distance measuring systems having utility in the aircraft guidance and landing art.

Active distance measuring equipment (DME), in which an airborne electronic source of radiating energy is used to measure the distance of an aircraft from a selected cooperating ground station or transponder, is an accepted part of the electronic assistance to aviators art. A precise measurement of distance between a landing aircraft and the end of the aircraft's intended landing runway is an example of the measurement accomplished with such equipment. Such measurement is of vital interest to the aircraft's pilot, especially during nighttime and inclement weather landing events and information of a related nature is also needed during precision flight missions.

In the modern military environment, however, the advent of signal-seeking missiles and ground-based signal detection apparatus has made the use of active or signal-emitting distance measuring equipment undesirably hazardous in many combat situations. Even in non-combat and civilian aviation environments the ever-increasing problem of signal spectrum allocation and interference between signals has made the use of active signal emitting equipment a practice to be reduced whenever possible, particularly within the limited physical separation confines of an aircraft.

The present invention offers an alternate arrangement for distance measuring, an arrangement which is energy radiation-free and therefore passive rather than active in nature with respect to the aircraft whose distance is being measured. Moreover, the disclosed arrangement may employ equipment already provided for aircraft landing assistance as a source of ground-based illumination for the distance measuring function.

The herein disclosed system is based on the simple geometric principle that an object rotating at a fixed angular velocity includes a radius vector, connecting with the axis of rotation, which rotates at the fixed angular velocity. Points along this radius vector however move with a scalar velocity that is directly proportional to the point's distance from the axis of rotation, i.e., distance along the radius vector. For example, the scalar velocity of a point at the circumference of a rotating wheel is greater than the scalar velocity of a point located near the wheel's center even though both have the same angular velocity about the wheel's center. In the present invention this concept is applied to a narrow beam of radio frequency energy rotating at a fixed and known angular velocity.

The patent art shows examples of apparatus which is of general background interest with respect to the present invention. Included in this art is U.S. Pat. No. 4,438,439 issued to J. S. Shreve which concerns a self-survey method and apparatus in which a passive station may locate itself with respect to a stationary or moving transmitting station which provides a narrow scanning beam. The Shreve passive station receives direct pulses from the transmitting station and receives reflected pulses from a set of scattering reflecting objects. In the Shreve invention the location of the passive station is determined by a plurality of distance and angle measurements with respect to these signals reaching the passive station from the transmitting station. Since the Shreve invention does not contemplate a measurement of time difference of arrival between points of known separation distance and since the Shreve invention is based on propagation or travel times rather than scanning times, the present invention is readily distinguished from concepts disclosed in the Shreve patent.

Also included in this patent art of general interest is the U.S. Pat. No. 5,053,784 of L. Hippelainen which concerns an apparatus and method for measuring the azimuth and elevation of an object through the use of plural radiating elements. Since the present invention is concerned with a distance measuring arrangement, a ready distinction over the Hippelainen disclosure is apparent.

SUMMARY OF THE INVENTION

In the present invention, aircraft ground range distance is measured along a radial vector connecting a source of radio frequency energy with the aircraft. This range distance is determined by measuring the time difference of arrival (TDOA) of energy from the radio frequency source at reception points of known physical separation on the receiving aircraft. According to the invention, for example, the predetermined known angular sweep rate of a radio frequency energy source results in a small difference in arrival time when the aircraft is located at a great distance from the sweeping source of energy and the scalar velocity of the energy wave's sweep movement is thereby relatively large. The time difference of arrival is greater when the aircraft is located relatively close to the sweeping energy source and the energy beam thereby has a smaller scalar movement velocity.

It is therefore an object of the present invention to provide a distance measuring arrangement in which an aircraft performing the distance measurement need not include a source of radio frequency energy emission.

It is another object of the invention to provide a passive distance measuring arrangement in which only a ground-based source of radio frequency illumination is required for operation.

It is another object of the invention to provide a distance measuring apparatus which may employ existing pilot assistance ground equipment as a source of radio frequency illumination for an aircraft.

It is another object of the invention to provide a passive airborne distance measuring arrangement which may employ the radio frequency illumination from a ground-based microwave landing system apparatus as the source of distance measuring illumination.

It is another object of the invention to provide a passive distance measuring arrangement in which any one of several different narrow beam sources may be used as the needed source of radio frequency illumination.

It is another object of the invention to provide existing microwave landing system (MLS) ground-based and airborne equipment with additional useful capability in the distance measuring or ranging art.

It is another object of the invention to provide a distance measuring arrangement in which a physically swept or displaced radio frequency energy beam's differing arrival times at separated points on the distance measuring aircraft is used as a measurement of distance between the aircraft and the radio frequency energy source.

It is another object of the invention to provide a passive ranging arrangement in which aircraft mounted antennas displaced along a cord vector of a range distance determined circle (a circle centered on a ground-based source of radio frequency energy) are used in combination with a known sweep angular velocity to compute a range radius vector length.

It is another object of the invention to provide, in a system of the foregoing type, means for correcting the presence of aircraft roll around a front-to-back aircraft axis and aircraft yaw or crab angle rotation about an aircraft top-to-bottom centroidal axis.

It is another object of the invention to provide a plurality of differing algorithms for interpreting signal time difference of arrival information received by separated aircraft antennas.

It is another object of the invention to provide for a distance measuring arrangement of the above type in which the physically displaced aircraft antennas are located on opposed wingtips of the aircraft or at other points of the aircraft such as at the nose and tail. The latter location is most desirable, where distance to a radio frequency source disposed broadside to the aircraft is to be measured.

It is another object of the invention to provide a distance measuring arrangement of the above-described type wherein the radio frequency energy source can be replaced by a source of laser or other optical energy in some uses.

It is another object of the invention to provide for a passive distance measuring arrangement in which large aircraft size and greater antenna physical displacements offer an improvement in measurement accuracy.

It is another object of the invention to provide an MLS based distance measuring arrangement in which the aircraft received data originating with both the "TO" and "FRO" MLS scans may be utilized advantageously to overcome antenna signal communicating cable length differences and certain other error generating sources.

Additional objects and features of the invention will be understood from the following description and claims and the accompanying drawings.

These and other objects of the invention are achieved by aircraft ranging apparatus comprising:

source means located at a radius vector terminal point for generating a predetermined width narrow beam (e.g., 1 to 2 horizontal plane degrees) of radio frequency energy having a fixed predetermined angular sweep velocity about the radius vector terminal point;

the predetermined width narrow beam of radio frequency energy thereby also having a scalar velocity, along a cord vector perpendicular to said radius vector, that is proportional to the aircraft range length of said radius vector;

means for measuring a delay time interval between arrival of the source means originated radio frequency signals at predetermined physical distance segregated points contiguous of the aircraft; and means for computing from the aircraft predetermined physical segregation distance, the fixed predetermined angular sweep velocity and the measured delay time interval, a radius vector length range of the aircraft from said terminal point radio frequency energy source.

BRIEF DESCRIPTION OF THE DRAWINGS

FIG. 1 shows an overall plan view of a distance measuring system according to the invention.

FIG. 2 shows the nature of data pulses generated within the aircraft of the FIG. 1 system.

FIG. 3 shows a block diagram implementation of a measurement system according to the invention.

FIG. 4 shows the data reception and signal processing portions of a second implementation of the invention.

FIG. 5 shows computation portions of the FIG. 4 implementation of the invention.

FIG. 6 defines an error generating angle in a system according to the invention.

FIG. 7 defines a second error generating angle for the invention.

DETAILED DESCRIPTION

FIG. 1 in the drawings shows a plan view of a distance measuring equipment (DME) system that is in accordance with the present invention. In the FIG. 1 system a distant aircraft 100, to which the range from the antenna of a microwave landing system (MLS) 108 is to be measured, is shown to be approaching a runway 106. In the FIG. 1 DME system the aircraft 100 is provided with a pair of wingtip mounted antennas 102 and 104 which are shown in a somewhat exaggerated and symbolic form. The MLS system 108 in the FIG. 1 drawing is shown to be associated with a plurality of azimuth antenna radiation lobes which are indicated at 112, 114, 116 118 and 120 with the lobe at 112 being the main lobe and having a nominal width which is actually in the order of one degree of azimuth.

As is indicated at 122 in FIG. 1 the main lobe 112 is shown to be in a clockwise moving condition which, according to the conventions adopted with the MLS system 108, is understood to be a "TO" scan. A similar and counterclockwise rotating scan 132 is known as a "FRO" scan in the MLS system. The angle of azimuth scanning by the main lobe 112 is in the order of 60 degrees to the left and right of the runway 106 center line.

The FIG. 1 MLS or microwave landing system is an aircraft pilot assistance system enabling precision landings during nighttime and inclement weather and is a system which replaces the older and more widely known "ILS" or instrument landing system. The MLS is more fully described in the text series titled "Advances in Electronic and Electron Physics". This text series is edited by Claire Marton of the Smithsonian Institution, Washington D. C., with volume 57 dated 1981 being of special interest with respect to the microwave landing system. The "Advances in Electronic and Electron Physics" text series is published by Academic Press and includes a chapter in volume 57 titled "Microwave Landing System: The New International Standard" authored by Henry W. Redlien and Robert K. Kelly of the Communications Division of Bendix Corporation, of Towson, MD. As indicated in the Redlien and Kelly article, the microwave landing system dates to the late 1970's with wide implementation of the system having commenced in the later 1980's.

An azimuth sweeping main lobe of this microwave landing system is a preferred source of microwave radio frequency energy illumination for use in the FIG. 1 embodiment of the present invention. The entire contents of the above-cited Redlien and Kelly article are therefore hereby incorporated by reference into the present document. This incorporation includes the documents listed in the references portion of the Redlien and Kelly article at its close. It is, of course, intended that the present invention not be limited to this use of the microwave landing system as a source of microwave frequency energy illumination. Actually any source of radio frequency or other energy having a relatively narrow beam width and a precisely known or predetermined rate of azimuth sweep is also a functionally suitable source of illumination for the invention and its FIG. 1 embodiment.

Additionally shown in FIG. 1 is a conventional non-passive aircraft type of distance measuring equipment which may be located at 110 adjacent the MLS antenna at 108. Such conventional equipment may be useful for comparison or standby usage in the FIG. 1 scenario, but is, however, largely replaced by the concepts of the present invention.

Also shown in the FIG. 1 drawing is an arc 124 of the azimuth range circle whose radius vector 128 along the center line of runway 106 represents the range of the aircraft 100 from the MLS antenna 108. The cord 126 of this range circle arc 124 is drawn perpendicular to the runway center line radius vector 128. According to the position and orientation of the aircraft 100 in FIG. 1, the wingtip-to-wingtip cord 130 of the aircraft is parallel to the range circle arc cord 126.

If the aircraft 100 is a large cargo or transport aircraft such as the KC-135 refueling tanker used by the U.S. Air Force, the antennas 102 and 104 may be physically separated by a distance such as 131 feet. With a separation distance of this magnitude and an MLS system antenna slewing rate of 20,000 degrees per second, a time difference of arrival of 37 microseconds can be expected when the radius vector 128 is 10,000 feet long or the length of a full capability military aircraft runway. Additional details regarding this combination of aircraft and distances and time are provided in example 1 which is recited below.

EXAMPLE 1: KC-135 at Runway Threshold

--- wing span = $w_s$ = 131 feet;
aircraft misalignment with runway heading = $\theta_M$*;
electronically scanned MLS Az antenna slewing rate = $\theta_{MLS}$ = 349 radians/sec;
aircraft roll angle = $\phi$;
MLS azimuth antenna mainlobe slew rate = 20,000°/sec = $MLS$;
main lobe transit time across wing span = $\Delta t$ = TDOA = 37 $\mu$sec;
R = range to MLS antenna located on runway center line at stop end;
R = $(w_s \cdot \cos\theta_M \cdot \cos\phi)/(\Delta t \cdot \theta_{MLS})$;
R ≈ 10,000 feet.

---

According to example 1 the time between arrival of main lobe 112 radio frequency energy at the antenna 102 and at the antenna 104 can be expected to be 37 microseconds where the MLS antenna is of the fixed element electronically slewed type having a slewing rate of 20,000 degrees per second. For determining this time difference of arrival or TDOA, either the leading edge of the main lobe 112 or its trailing edge or the lobe peak or any other convenient and precisely determinable point may be considered as the point of main lobe reference. Additional details concerning this main lobe reference point are disclosed in the paragraphs below in connection with signal processing considerations for the present invention.

It is significant to note that the thirty-seven microsecond time difference of arrival for example 1 increases to a greater time difference of arrival for ranges of the aircraft 100 that are less than 10,000 feet. This time also becomes smaller than 37 microseconds if the aircraft has a range greater than 10,000 feet. This short time at great range and longer time at short range relationship, of course occurs because of the increased scalar velocity of points along the main lobe 112 with increasing lengths of the radius vector 130. This increasing velocity is in harmony with the above-cited well-recognized phenomenon that the scalar velocity of a point on the circumference of a wheel is greater than that of a point near the center of the wheel even though both are moving at the same angular velocity about the center of the wheel.

This relationship also implies that short distances, corresponding to larger time differences, can be measured more accurately, i.e., accuracy improves with decreased distance to go during landing. Such increased accuracy at decreased distance is very desirable in many uses of the herein-described concepts, since distances often become of paramount concern only when the aircraft is close to the ground or close to the runway ending and are of some lesser concern while the aircraft is in the air and away from fixed objects.

It is especially significant to note that the ranging system shown in FIG. 1 operates without the use of energy radiating from the aircraft 100; that is, the only source of illuminating radio frequency energy in FIG. 1 is the antenna of the MLS system indicated at 108. The aircraft 100 of course can be expected to reflect some of the energy received from the MLS system 108 and indeed certain hostile weapons systems may be capable of operating with such reflected illumination energy. In the case of a low reflection modern stealth aircraft and with the aircraft contained source of radio frequency energy removed, the signal available to such hostile weapons is greatly reduced from that of other distance measuring systems, however.

FIG. 2 in the drawings shows a representation of the signals generated at the FIG. 1 antennas 102 and 104 in response to energization by the main lobe 112 when this main lobe executes both the "TO" scan indicated at 122 and the "FRO" scan indicated at 132 in FIG. 1. The FIG. 2 signals represent the envelope waveform of the microwave carrier radio frequency signals received at the antennas 102 and 104, the microwave carrier is of course of much higher frequency content and is not shown in FIG. 2. In the FIG. 2 drawing the waveform pair 206 of the pulse family 200 is generated by the "TO" movement of the MLS azimuth antenna, while the waveform pair 208 is generated by the "FRO" movement of the antenna and the main lobe 112—as is indicated at 132 in FIG. 1. In the FIG. 2 signals, received signal amplitude is represented along the vertical axis 202, values along this axis representing signal strength in decibels, for example. The horizontal axis 204 in the FIG. 2 drawing represents time with the time value of 13,000 microseconds, for example, occurring at 222. In the pulse pair 206 of FIG. 2 the signal received at the right wing antenna 102 in FIG. 1 is indicated at 214, while the signal received at the left wing antenna 104 is indicated at 216. Each of these antenna signals also includes responses originating in the minor lobes 114, 116, 118 and 120 of FIG. 1, as are indicated generally at 218 and 220 in FIG. 2. The time difference of arrival (TDOA) for the antennas 102 and 104 is indicated at 210 in FIG. 2; the TDOA or time between corresponding points of the pulse waveforms 214 and 216 is 37 microseconds for the example 1 conditions described in connection with FIG. 1.

The pulse pair 208 in FIG. 2 repeats the characteristics described above for the pulse pair 206 with the exception of the relationship between these pulses and the respective wingtip antennas 102 and 104 being reversed in the pulse pair 208. That is, in the pulse pair 208 the early or leftmost pulse 226 originates in the left wing antenna 104 and the later or rightmost pulse 224 in the right wing antenna 102. These reversed early pulse, late pulse, left wing, right wing, relationships of course originate in the reversed scanning direction of the main lobe 112 in the "TO" and "FRO" scans at 122 and 132. The time difference of 37 microseconds is also present in the pulse pair 208, as is indicated at 212.

As be may ascertained from a detailed consideration of the MLS system description in the above-cited Redlein and Kelley publication, the MLS system uses the time between consecutive "TO" and "FRO" passes of the mainlobe beam 112 to derive the azimuth angle of the aircraft with respect to the runway centerline. For such MLS system usage, the aircraft may be provided with only a single antenna and the data generated in such antenna is of the nature of a single pair of the pulses appearing in FIG. 2; that is, in the form of the pulse 214 and the pulse 224, both of which originate in the right wing antenna 102 in the FIG. 1 and FIG. 2 arrangements. In this MLS conventional usage of the FIG. 1 and FIG. 2 signals, the precise position of the pulses 214 and 224 along the horizontal axes 204 is of course dependent upon the azimuth position of the receiving aircraft with respect to the antenna supplying the mainlobe 112 and also somewhat dependent upon the location of the MLS antenna on the aircraft 100.

The present invention usage of the MLS main lobe illumination signal of course, operates according to a differing set of rules and is in fact primarily concerned with the smaller time differences between the pulses 214 and 216 and the pulses 224 and 226, with such time difference being measurable at any conveniently repeatable point of the waveforms 214 and 216 or 224 and 226. In FIG. 2 this conveniently repeatable point of the waveforms 214 and 216 is indicated to be the rounded peak points of these pulsed waveforms—and indeed electronic peak detection circuitry may be employed in measuring this time difference between the pulses 214 and 216, for example.

In order to accurately and electrically measure the time difference between two rounded curvature waveforms, it is of course, desirable that the waveforms be of equalized amplitude and that there be no signal processing delay differences, such as caused by antenna cable length differences or receiver process delays within the aircraft 100. The presence of the repeating or redundant pulse pairs 206 and 208 in the FIG. 2 waveforms of the present invention can in fact be used to compensate or overcome the presence of cable length delay differences or receiver process delay differences in the present invention.

Since during a "TO"-scan it is predictable that the right wing antenna pulse occurs first, while during a "FRO" scan it is predictable that the left wing antenna pulse occurs first, in the presence of an undesired fixed delay the left wing or right wing channel delays can be eliminated by, for example, a mathematical averaging technique in which looking down from above:

CW="TO"=R→L

CCW="FRO"=L→R.

The left-to-right "FRO" scan measured transit time across the wingspan is averaged with the right-to-left "TO" scan measured transit time. The average value removes any uncalibrated difference in delay between the left and right channels due to cable length differences or receiver delays, thereby yielding the true TDOA between wingtip antenna.

FIG. 3 in the drawings shows a block diagram and signal waveform representation of the above mentioned peak detecting embodiment of the present invention. In the FIG. 3 implementation of the FIG. 1 and FIG. 2 concepts, one wingtip antenna is indicated at 302 and the envelope waveform received at this antenna is indicated at 300. The peak detector circuitry for this antenna is indicated at 308 and the resulting peak detection pulse is indicated at 312. In a similar manner the opposite wingtip antenna is indicated at 306, its waveform at 304 and the associated peak detector and peak indicating pulse at 310 and 314 respectively. In the FIG. 3 implementation of the invention, a clock circuit 322 is used to supply an accurately timed sequenced of pulses as is indicated at 323, and one of the pulses 312 and 314 is used to start the counting of these pulses in a counter circuit 316 while the other of these pulses is used to stop the counting. The number of pulses between a start or an enable pulse as shown at 324 and a disable or reset pulse as shown at 326 is therefore an indication of the time difference between signals arrivals at the two antennas 302 and 306. The pulses intervening between the enable and disable pulses 324 and 326 are indicated at 330 in FIG. 3 and the intervening time of 37 microseconds, as is appropriate for the above example, is indicated at 328 in FIG. 3.

The waveform at 324, 326, and 330 in FIG. 3 is applied to a conversion circuit 318 wherein the relationship between measured time or TDOA and range along the range vector 130 in FIG. 1 can be determined. Appendix B herein shows a table of nautical miles to microseconds of time difference of arrival values that is applicable to the 131 foot wingspan aircraft example 1 cited in connection with FIGS. 1 and 2 above. The table in Appendix B also includes a third column of data which indicates the error to be expected from a one sample period or one-tenth microsecond miscorrelation error in the signal processing.

Appendix A herein shows a computer routine that may be used to generate the data shown in the table of Appendix B; this routine may of course be modified for greater, lesser or intervening nautical mile distances. Once converted to range indicating numbers in the block 318, the time difference of arrival data may be displayed in the form of numbers or in other display formats on a cathode ray tube or other selected form of display in the block 320 of FIG. 3.

Another realization of signal processing for the present invention is shown in FIG. 4 of the drawings. In FIG. 4 the antennas 402 and 426 receive signals of the envelope waveforms indicated respectively at 400 and 424. These signals are passed into a dual channel receiver having the radio frequency amplifier, local oscillator, and mixer circuits of the conventional superheterodyne receiver—as is indicated at 404, 406 and 410 for the topmost or first receiver channel and at 428, 430 and 432 for the second receiver channel. Signals generated in the radio frequency mixer stages 408 and 432 are communicated to logarithmic intermediate frequency amplifiers 414 and 436 by way of the frequency selective filter stages 412 and 434 which provide bandpass filtering enhancement of the mixer output signal.

Once increased in signal amplitude in the logarithmic intermediate frequency amplifiers 414 and 436, the signals are applied to second detector or video detector circuits 416 and 438 and to the video amplifiers 418 and 440. The output signals of the video amplifiers are coupled to envelope filter circuits 420 and 442 which have a bandpass in the range of 36 kilohertz in order that bandpass filtering be accomplished. The waveform outputs of these filters are applied to high-speed analog-to-digital converters, represented by the blocks 422 and 446, in order to obtain digital representations of the signal waveform envelopes. These converters are synchronized in their operation by a source of signals indicated at 449. Sampling analog-to-digital converters suitable for this usage are available in the commercial market. An example of such an analog-to-digital converter is the ADS-112MC, ADS-117MC, and ADS-118MC family of converters manufactured by Datel Corporation of Mansfield, MA.

The digital signals from the analog-to-digital converters 422 and 446 may be further processed into the numeric or graphic range indicating format suitable for a display 514 by way of a microprocessor embodied algorithm as is represented in FIG. 5 of the drawings. In this microprocessor algorithm, the digital signals of the two analog-to-digital converters 422 and 446 appear on the paths 448 and 450, which are also shown in FIG. 5, and these signals are arranged in the form of a data array of some number of specific points in the blocks 500 and 516. These data arrays are also inclusive of end point zero pads which are useful for making block sizes powers of 2 in the subsequent signal processing.

Fast Fourier transformations are accomplished on these data arrays in the blocks 502 and 518 with the output signals from these transformations being identified as S1 and S2 and applied to the multiplication step of block 504. The transformation and multiplication of transformed signal envelope data computes a cross-spectrum in this processing. The multiplied signals are subjected to inverse transformation in the block 506 and to yield cross-correlation in the block 508.

The peak of the cross-correlated waves from 508 is located in the processing of block 510, such peaks representing a precisely identifiable location in the envelope waveforms 400 and 424 in order that precise values of time difference of arrival be available. The conversion of time difference of arrival values to aircraft range as is indicated in Appendix A hereof is accomplished in the block 512 and a hardware implemented numeric or graphic display of the range information is indicated at 514 in FIG. 5. In comparison with the simplified processing of FIG. 3, the more sophisticated process of FIGS. 4 and 5 accomplishes a more accurate measurement of TDOA in implementing the invention.

It may be appreciated that either a roll attitude of the aircraft 100 in FIG. 1 (i.e., a rotation about the aircraft's front to back axis) or a yawing or crabbing of the aircraft (about its top to bottom axis) will foreshorten the effective distance between the antennas 102 and 104 and thereby decrease the time difference of arrival between the two signal receptions of the main lobe 112. Such flight attitudes thereby appear to increase the range of the measuring aircraft. Such roll and crab angle orientations of a receiving aircraft are illustrated in FIGS. 6 and 7 of the drawings. In FIG. 6 the angle $\phi$ as indicated at 602 may be used to measure the true horizontal component of the distance between wingtip antennas when the aircraft 600 is in the illustrated roll attitude. This horizontal component is in effect the wing span distance of the aircraft multiplied by the cosine of the angle $\phi$. In a similar manner, the angle $\theta$ is used in FIG. 7 to measure a yaw or crab angle of the aircraft 700. The effective base line for the aircraft 700 is its wingspan multiplied by the cosine of the angle $\theta$.

Accommodation of the roll and yaw angles illustrated in FIGS. 6 and 7 may of course be incorporated into the time difference of arrival processing algorithm illustrated in FIG. 5, especially at the block 512. In such correction, the wingspan distance becomes the actual wingspan multiplied by a cosine function with the appropriate angle size being obtained from other instrumentation such as the roll and bank indicator of the aircraft for the FIG. 6 angle.

Since the greatest accuracy of distance measurement is obtained when wingtip antenna separation is large, the aircraft attitudes illustrated in FIG. 6 and FIG. 7 result in some decrease in determined range accuracy. In a similar vein, the shorter wingspans of a fighter or tactical aircraft also tend to degrade the accuracy of distance determinations made according to the invention. For smaller angles in the FIG. 6 and 7 examples, and for aircraft of subsonic and moderate supersonic wingspan configurations the available antenna separation distance is sufficient for many flying purposes.

Other arrangements of the invention will of course, occur to persons skilled in the pilot assistance and related arts. These other arrangements may include, for example, the use of alternate signal processing from that shown in FIGS. 3–5. For example, the computation of a running average of signal peak amplitudes and use of a Schmitt trigger electronic circuit to compare instantaneous signal amplitudes with this computed running average may be used. A Schmitt trigger circuit's "firing point" indicates digitally the time instant at which the input signal crosses the analog-to-digital threshold level which is derived from the running average signal. Another modification of the disclosed apparatus may take the form of employing laser energy rather than radio frequency energy for generating the illumination lobe 112 in FIG. 1. This arrangement is especially usable over shorter distances and where weather conditions are not a barring consideration.

With respect to another arrangement of the invention, the above-described cross-correlation is implemented using the FFT algorithm in the frequency domain. Such an algorithm could also be implemented in the time domain by computing the cross-correlation function for corresponding oints on two waveforms at successive delays, i.e., by sampling offsets and selecting the delay value with the largest cross-correlation as the transit time measurement.

Yet another arrangement of the invention may be achieved when the antennas 102 and 104 in FIG. 1 are disposed near the front and rear respectively of the aircraft 100 or where one of these antennas is received on the aircraft 100 and the other is disposed at the end of a signal communicating cable behind the aircraft. Each of these latter two configurations of the invention would of course be useful where the distance being measured lies to the side of the aircraft rather than to the front, as is appropriate in a landing scenario. In a similar manner the aircraft 100 in FIG. 1 might have the antennas 102 and 104 disposed in a backward looking direction where the distance from a point of origin is to be measured as might be important in certain military weapons delivery situations.

The herein described passive ranging system is therefore useful to determine "distance to go" during MLS landing operations for example, as well as other range distances. The system notably eliminates the need to carry DME interrogator equipment on the aircraft. The disclosed invention also simplifies MLS ground equipment requirement by eliminating the usual ground-based DME transponder. The disclosed system also facilitates aircraft avoidance of hostile fire by eliminating a need to transmit interrogator pulses to the ground-based DME transponder from the aircraft.

While the apparatus and method herein described constitute a preferred embodiment of the invention, it is to be understood that the invention is not limited to this precise form of apparatus or method and that changes may be made therein without departing from the scope of the invention which is defined in the appended claims.

APPENDIX A

```
10 CLS
20 PRINT"****************************************************
30 PRINT"*     MLS Az Scan TDOA Computation              *
40 PRINT"*                                               *
50 PRINT"*            by J. Franzen                      *
60 PRINT"****************************************************
70 PI = 4*ATN(1)
80 DTR = PI/180
90 THETA.DOT = 20000!  ' MLS angular scan rate
100 THETA.DOT = THETA.DOT*DTR
110 PRINT "Theta_dot = ";THETA.DOT; "Rad/sec"
120 WING.SPAN = 131     ' KC-135 wing span
130 '
140 LPRINT "MLS Az Scan TDOA Computation"
150 LPRINT "KC-135 Wing span = 131 feet"
160 LPRINT "MLS scan rate = 20,000 deg/sec"
170 PRINT "Sample period = .1 micro-second"
180 LPRINT "****************************************************"
190 LPRINT " Nautical Miles      Micro-seconds
200 FOR K = 1 TO 20
210 DT = WING.SPAN/(THETA.DOT*K*6076.11)*1000000!
220 DR = WING.SPAN/
     (THETA.DOT*(DT/10000001) 2) * .0000001
230 LPRINT K;" Nmiles",DT;" Microsec",dr;" Feet"
240 NEXT K
```

APPENDIX B

MLS Az Scan TDOA Computation
KC-135 Wing span = 131 feet
MLS scan rate = 20,000 deg/sec

| Nautical Miles | | Micro-seconds | |
|---|---|---|---|
| 1 N miles | 61.76441 | Microsec | 9.837559 Feet |
| 2 N miles | 30.8822 | Microsec | 39.35024 Feet |
| 3 N miles | 20.58814 | Microsec | 88.353803 Feet |
| 4 N miles | 15.4411 | Microsec | 157.4009 Feet |
| 5 N miles | 12.35288 | Microsec | 245.939 Feet |
| 6 N miles | 10.29407 | Microsec | 354.1521 Feet |
| 7 N miles | 8.826488 | Microsec | 482.0403 Feet |
| 8 N miles | 7.720551 | Microsec | 629.6038 Feet |
| 9 N miles | 6.862712 | Microsec | 796.8423 Feet |
| 10 N miles | 6.17644 | Microsec | 983.756 Feet |
| 11 N miles | 5.614946 | Microsec | 1190.345 Feet |
| 12 N miles | 5.147034 | Microsec | 1416.609 Feet |
| 13 N miles | 4.751108 | Microsec | 1662.548 Feet |
| 14 N miles | 4.411744 | Microsec | 1928.161 Feet |
| 15 N miles | 4.117627 | Microsec | 2213.451 Feet |
| 16 N miles | 3.860275 | Microsec | 2518.415 Feet |

APPENDIX B-continued

MLS Az Scan TDOA Computation
KC-135 Wing span = 131 feet
MLS scan rate = 20,000 deg/sec

| Nautical Miles | | Micro-seconds | |
|---|---|---|---|
| 17 N miles | 3.633201 | Microsec | 2843.055 Feet |
| 18 N miles | 3.431356 | Microsec | 3187.369 Feet |
| 19 N miles | 3.250758 | Microsec | 3551.359 Feet |
| 20 N miles | 3.08822 | Microsec | 3935.024 Feet |

I claim:

1. Aircraft ranging apparatus comprising:

source means located at a radius vector terminal point for generating a narrow beam of microwave radio frequency energy having a fixed predetermined angular sweep velocity about said radius vector terminal point;

said source means including an aircraft microwave landing system radio frequency energy source having electronically scanned antenna array means for accomplishing remote craft azimuth guidance;

said narrow beam of microwave radio frequency energy also having a scanning velocity, along a cord vector perpendicular to said radius vector, that is proportional to a said aircraft range determined length of said radius vector;

means for measuring a delay time interval between arrival of said source means originated microwave radio frequency energy signals at predetermined physical distance segregated radio frequency antennas located at opposed wingtip extremities points contiguous of said aircraft; and means for computing from said aircraft predetermined physical segregation distance, said fixed predetermined angular sweep velocity, and said measured delay time interval, a radius vector length range of said aircraft from said terminal point radio frequency energy source.

2. The apparatus of claim 1 wherein said antenna array means has a scanning rate angular velocity of twenty thousand degrees per second.

3. The apparatus of claim 1 wherein said means for computing further includes means for correcting said computed radius vector length range for aircraft roll and yaw angles differing from level flight along a radius vector aligned with said terminal point.

4. The apparatus of claim 1 wherein said means for measuring includes signal processing means for identifying corresponding envelope waveform points on radio frequency envelope waveform signals received from said source means via said aircraft physical distance segregated points.

5. The apparatus of claim 4 wherein said means for identifying corresponding envelope waveform points comprises one of the signal processing techniques taken from the group comprised of:

a cross correlation mathematical function;

a frequency domain Fourier transform mathematical algorithm;

a time domain Fourier transform mathematical algorithm;

a Fast Fourier Transform mathematical algorithm;

a waveform peak detector; and an analog-to-digital converter.

6. The apparatus of claim 1 wherein said microwave landing system includes a radio frequency beamwidth smaller than two degrees of azimuth and includes a beam sweep angle of sixty degrees.

7. The apparatus of claim 1 wherein said microwave landing system includes a "TO" sweep comprising beam movement in one of a clockwise and counterclockwise sweep direction and a "FRO" sweep comprising beam movement in the opposite of said clockwise and counterclockwise sweep directions and wherein said apparatus further includes signal processing means for increasing the accuracy of said radius vector length computation by averaging signals generated during said "TO" and "FRO" direction sweeps.

8. The method for determining aircraft range from a measuring location comprising the steps of:
 disposing a narrow beam source of radio frequency energy of predetermined azimuth angular sweep velocity at a center point of an azimuth circle located at said measuring location;
 said azimuth circle also including a radially oriented range vector originating at said center point and extending to said aircraft;
 measuring a sweep angular velocity related time interval between arrival of said narrow beam energy at two azimuth circle cord elements defining physically separated opposed wingtip points on said aircraft; and
 computing from said predetermined angular sweep velocity, said measured time interval, and said cord element aligned wingtip physical separation distance, a range distance along said radial vector, between said azimuth circle center point located source of radio frequency energy and said aircraft;
 said computing step including correction for one of the conditions of said aircraft's wings being in a roll angle position with respect to a horizon reference and said aircraft being disposed in a yaw angle orientation with respect to said range vector.

9. The method of claim 8 wherein said narrow beam source of radio frequency energy comprises a microwave energy source having landing assistance capability and a predetermined range of electronic scanning generated angular displacement within said azimuth circle.

10. Aircraft distance to runway measuring apparatus of a passive non radiating type comprising the combination of:
 ground based Microwave Landing System apparatus of microwave "C" band operating frequency, a radiated radio frequency energy output beam of twenty thousand degrees per second sweep rate, sweep extending over a total angle of sixty degrees of azimuth on either side of a runway centerline, and a beam width not exceeding three degrees of azimuth;
 radio frequency receiver means including first and second receiving antenna members of predetermined physical separation distance disposed at opposite wingtip locations of said aircraft;
 said receiver means also including signal processing means for identifying predetermined radio frequency carrier envelope waveform locations on said received radio frequency signals;
 said receiver means also including electrical circuit means for measuring a time interval between sweeping of said output beam between said first and second receiving antenna members on said aircraft in response to said predetermined fixed azimuthal sweep rate and means for relating said measured time interval to a distance measurement between said aircraft and said runway;
 said receiver means also including signal processing means for correcting a computed range distance for non zero angles of roll and yaw of said aircraft.

* * * * *

UNITED STATES PATENT AND TRADEMARK OFFICE
CERTIFICATE OF CORRECTION

PATENT NO. : 5,302,957
DATED : April 12, 1994
INVENTOR(S) : John P. Franzen

It is certified that error appears in the above-identified patent and that said Letters Patent is hereby corrected as shown below:

Column 4, line 34, a comma should follow "116".

Column 11, line 46, a caret should precede "2".

Signed and Sealed this

Second Day of May, 1995

Attest:

BRUCE LEHMAN

Attesting Officer

Commissioner of Patents and Trademarks